US009553879B2

(12) United States Patent
Punaganti Venkata et al.

(10) Patent No.: US 9,553,879 B2
(45) Date of Patent: Jan. 24, 2017

(54) METHOD AND APPARATUS TO REPRESENT AND USE RIGHTS FOR CONTENT/MEDIA ADAPTATION/TRANSFORMATION

(75) Inventors: Murali Krishna Punaganti Venkata, Vantaa (FI); Indrajit Chaudhuri, Espoo (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 1841 days.

(21) Appl. No.: 10/456,944

(22) Filed: Jun. 6, 2003

(65) Prior Publication Data

US 2004/0249943 A1    Dec. 9, 2004

(51) Int. Cl.
G06F 7/04 (2006.01)
H04L 29/06 (2006.01)
H04L 29/08 (2006.01)

(52) U.S. Cl.
CPC ........... H04L 63/102 (2013.01); H04L 67/28 (2013.01); H04L 67/2852 (2013.01); H04L 69/329 (2013.01)

(58) Field of Classification Search
CPC ............ H04L 12/5825; H04L 12/5835; H04L 67/2852; H04L 67/28
USPC ....................................................... 726/1, 26
See application file for complete search history.

(56) References Cited

U.S. PATENT DOCUMENTS

| 6,345,279 | B1 * | 2/2002 | Li et al. ...................... 707/104.1 |
| 6,407,680 | B1 * | 6/2002 | Lai et al. .......................... 341/50 |
| 6,563,517 | B1 * | 5/2003 | Bhagwat et al. ............. 715/735 |
| 6,593,860 | B2 * | 7/2003 | Lai et al. .......................... 341/50 |
| 7,356,575 | B1 * | 4/2008 | Shapiro ......................... 709/220 |
| 7,356,675 | B2 * | 4/2008 | Ozawa .......................... 712/219 |
| 8,621,025 | B2 * | 12/2013 | Ridgard et al. ............... 709/207 |
| 8,655,875 | B2 * | 2/2014 | Young ........................... 707/736 |
| 2002/0026445 | A1 * | 2/2002 | Chica et al. .................. 707/100 |
| 2002/0054090 | A1 * | 5/2002 | Silva et al. .................... 345/747 |
| 2002/0083157 | A1 * | 6/2002 | Sekiguchi et al. ............ 709/219 |
| 2002/0169823 | A1 * | 11/2002 | Coulombe et al. ........... 709/203 |
| 2003/0046407 | A1 * | 3/2003 | Erickson et al. ............. 709/229 |
| 2003/0126086 | A1 * | 7/2003 | Safadi ............................ 705/51 |

(Continued)

FOREIGN PATENT DOCUMENTS

WO    WO 02/091199 A1    11/2002

OTHER PUBLICATIONS

R. Han et al, Dec. 1998, IEEE Personal Communications, p. 8-17.*

(Continued)

*Primary Examiner* — Bradley Holder
*Assistant Examiner* — Jenise Jackson
(74) *Attorney, Agent, or Firm* — Core Wireless Licensing Ltd.

(57) ABSTRACT

The invention provides a method and apparatus for providing content in a network having a network proxy arranged between a mobile terminal and a content provider. The method features a step of adapting or transforming the content in the network proxy based on one or more digital rights issued by the owner of the content. The network proxy includes an adaption policy module that receives the digital rights and provides an adaption policy; and an adaption engine module that receives the adaption policy and the content from the content provider, and provides adapted content to the terminal. In operation, the network proxy uses the digital rights to determine an optimal adaptation policy and then uses that to transform the content.

18 Claims, 3 Drawing Sheets

(56) References Cited

U.S. PATENT DOCUMENTS

| | | | |
|---|---|---|---|
| 2003/0135411 A1* | 7/2003 | Ushiki et al. | 705/14 |
| 2003/0135468 A1* | 7/2003 | Barbir et al. | 705/64 |
| 2003/0208638 A1* | 11/2003 | Abrams et al. | 709/328 |
| 2003/0233330 A1* | 12/2003 | Raley et al. | 705/55 |
| 2003/0236883 A1* | 12/2003 | Takeshima et al. | 709/225 |
| 2003/0236892 A1* | 12/2003 | Coulombe | 709/228 |
| 2004/0003032 A1* | 1/2004 | Ma et al. | 709/203 |
| 2004/0024670 A1* | 2/2004 | Valenzuela | G06F 21/10 705/35 |
| 2004/0046778 A1* | 3/2004 | Niranjan et al. | 345/716 |
| 2004/0049462 A1* | 3/2004 | Wang | G06F 21/10 705/50 |
| 2004/0054689 A1* | 3/2004 | Salmonsen et al. | 707/104.1 |
| 2004/0083291 A1* | 4/2004 | Pessi et al. | 709/227 |
| 2004/0111476 A1* | 6/2004 | Trossen et al. | 709/206 |
| 2004/0128324 A1* | 7/2004 | Sheynman et al. | 707/200 |
| 2004/0216173 A1* | 10/2004 | Horoszowski et al. | 725/145 |
| 2004/0220878 A1* | 11/2004 | Lao | G06F 21/10 705/51 |
| 2004/0225524 A1* | 11/2004 | Narasimhan et al. | 705/1 |
| 2004/0236717 A1* | 11/2004 | Demartini | G06F 21/10 |
| 2005/0143136 A1* | 6/2005 | Lev et al. | 455/566 |
| 2006/0117379 A1* | 6/2006 | Bennett et al. | 726/3 |
| 2006/0242275 A1* | 10/2006 | Shapiro | 709/220 |
| 2006/0256130 A1* | 11/2006 | Gonzalez | 345/619 |
| 2007/0027814 A1* | 2/2007 | Tuoriniemi | 705/59 |
| 2007/0089151 A1* | 4/2007 | Moore | G11B 27/034 725/132 |
| 2008/0140433 A1* | 6/2008 | Levy | G06F 21/10 705/26.1 |
| 2008/0320599 A1* | 12/2008 | Raley | G06F 21/10 726/26 |
| 2009/0241199 A1* | 9/2009 | Valenzuela | H04N 21/83555 726/26 |
| 2010/0138351 A1* | 6/2010 | Gilliam | G06F 21/10 705/310 |
| 2011/0066844 A1* | 3/2011 | O'Toole, Jr. | 713/153 |
| 2013/0346324 A1* | 12/2013 | Wang | G06F 21/10 705/310 |
| 2014/0122630 A1* | 5/2014 | Trossen et al. | 709/206 |
| 2014/0172728 A1* | 6/2014 | Lenkov | G06F 21/10 705/310 |
| 2014/0280922 A1* | 9/2014 | Shapiro | H04N 7/17318 709/224 |
| 2015/0007247 A1* | 1/2015 | Dua | H04N 7/163 725/134 |

OTHER PUBLICATIONS

Lyijynen et al, Jun. 2003, IEEE Personal Communications, p. 721-724.*

A Context-Aware Decision Engine for Content Adaptation, 2002, Pervasive Computing, p. 41-49.*

Content Adaptation Framework: Bringing the Internet to Information Appliances, 1999, Global Telecommunications Conference, p. 2015-2021/.*

Context-Based Media Adaptation in Pervasive Computing, IEEE, Lei and Georganas, p. 0913-0918.*

Blair et al, A Principled Approach to Supporting Adaptation in Distributed Mobile Environments, 2000, IEEE, pp. 1-10.*

Holliday et al, Wireless Link Adaptation Policies: Qos for Deadline Constrained Traffic with Imperfect Channel Estimates, 2002, IEEE, pp. 3366-3371.*

* cited by examiner

Digital Rights:

- Privileges/rights for adapting content

- Absolute conditions
        - Boundary conditions

- Restrictions/constraints under which the adaptation/transformation procedure of the content takes place

- Used by the network proxy to determine an optimal adaptation policy to transform the content

- Issued by owner using a rights expression language (REL), having digital rights elements including an adapt element for providing a digital right in the form of a constraint on adapting the content, including its color, size, format, layout or quality.

Figure 3

METHOD AND APPARATUS TO REPRESENT AND USE RIGHTS FOR CONTENT/MEDIA ADAPTATION/TRANSFORMATION

BACKGROUND OF THE INVENTION

1. Field of Invention

This invention relates to content adaptation or media transformation in a general context; and more particularly relates to content adaptation or media transformation in the context of a mobile terminal.

In the future as the applicability of Digital Rights Management (DRM) increases in popularity there is a risk that general content adaptation done at some proxy network like a Wireless Application Protocol (WAP) network proxy may not be acceptable legally. This invention addresses this problematic situation and proposes a solution wherein the network proxy can still continue to do the content adaptation, but legally.

2. Description of Related Art

Content adaptation is likely to increasingly become a legal issue in the future. Moreover, it will be an increasingly more significant concern for market leaders in the mobile industry, since content adaptation is mostly required for terminals of limited capabilities in contrast to desktop personal computers or laptops which have significantly more capabilities.

With growing mobile access of Internet content, the necessity of adapting/transforming media or content included in the websites for optimal user experience is becoming increasingly necessary. Some websites are already not allowing any content adaptation on the client side. For example, sites of major companies already do not allow any content adaptation. Also, issues like scaling down an image to fit the appropriate screen size and resolution of a mobile terminal may in effect make the image unusable in its proper context. The same argument may hold with brand logos or other copyrighted information. In the future as the DRM increases in popularity there is a risk that general content adaptation done at some proxy like a WAP proxy may not be acceptable legally.

In the prior art, content adaptation is performed by the content provider or at the client side proxy. The content provider may not provide full content adaptation because then it may not really know the capabilities of the terminals for which it needs to adapt, nor is this approach cost effective. The content provider can provide the same content in different formats suitable for different devices, though this is an expensive approach. Even then, the problem of optimal user experience based on the terminal used is quite difficult to achieve. The content needs to be transformed/adapted on the fly in the network, with the knowledge of terminal capabilities and network parameters.

To date, there is no explicit need to obtain rights for transforming/adapting the content in the client side proxy, but, in future the scenario may become entirely different.

Further, there is no known prior art which provides a rights representation language or schemas for such content adaptation.

SUMMARY OF INVENTION

In its broadest sense, the present invention provides a new and unique method and apparatus for providing content in a network, including a mobile network, having a network proxy arranged between a mobile terminal and a content provider. The method features a step of adapting or transforming the content in the network proxy based on one or more digital rights issued by the owner of the content.

The network proxy includes an adaption policy module that receives the digital rights and provides an adaption policy; and an adaption engine module that receives the adaption policy and the content from the content provider, and provides adapted content to the terminal. In operation, the network proxy uses the digital rights to determine an optimal adaptation policy and then uses that to transform the content. The content provider has the responsibility of ensuring the integrity of the content is not lost in the adaptation process.

The digital rights may include privileges/rights for adapting the content, restrictions/constraints under which the adaptation/transformation procedure of the content takes place, or a combination thereof. The privileges/rights are absolute conditions for adapting the content, while the restrictions/constraints are boundary conditions for adapting the content.

The owner issues the digital rights using a rights expression language (REL). The rights expression language is modified to include a permission element for adapting the content, which can be executed/used in combination with already existing permission elements or any other permission elements that may emerge in the future. In particular, the rights expression language is modified to add an adapt element to specify digital rights for adaptation, including for providing a digital right in the form of a constraint on adapting the content; a constraint element for providing a digital right with respect to either the count, date/time, interval, color, size, format, layout or quality in relation to adapting the content, or a combination thereof; a color element for providing a digital right in relation to the color of the content; a size element for providing a digital right on the size of the content; a layout element for providing a digital right in relation to the layout of the content; a reformat element for providing a digital right in relation to the reformatting of the content; or a combination thereof.

The method further comprises implementing the step of the method via a computer program running in a processing means in the network server.

The present invention also provides a new and unique mobile network having a network proxy arranged between a mobile terminal and a content provider for providing content, in which the network proxy adapts or transforms the content based on one or more digital rights issued by the owner of the content, as well as a new and unique network that adapts or transforms the content based on one or more digital rights issued by the owner of the content.

The content may include person-to-person, application-to-person and general Web or WAP browsing content.

The present invention also provides a computer program product with a program code, which program code is stored on a machine readable carrier, for carrying out the steps of the method when the computer program is run in a processing means in the network server.

Advantages of the invention include the following:

1. The present invention enables content providers to specify and grant rights for adaptation of copyrighted content so that the semantic meaning or context of the original content is not lost in the adaptation process.

2. The present invention also enables the content providers to control the end user experience related to their content.

BRIEF DESCRIPTION OF THE DRAWING

The drawing, not drawn to scale, includes the following Figures:

FIG. 3 is a list of characteristics that define digital rights in relation to the content provided from the content provider to the terminal.

DETAILED DESCRIPTION OF INVENTION

Figure 1:
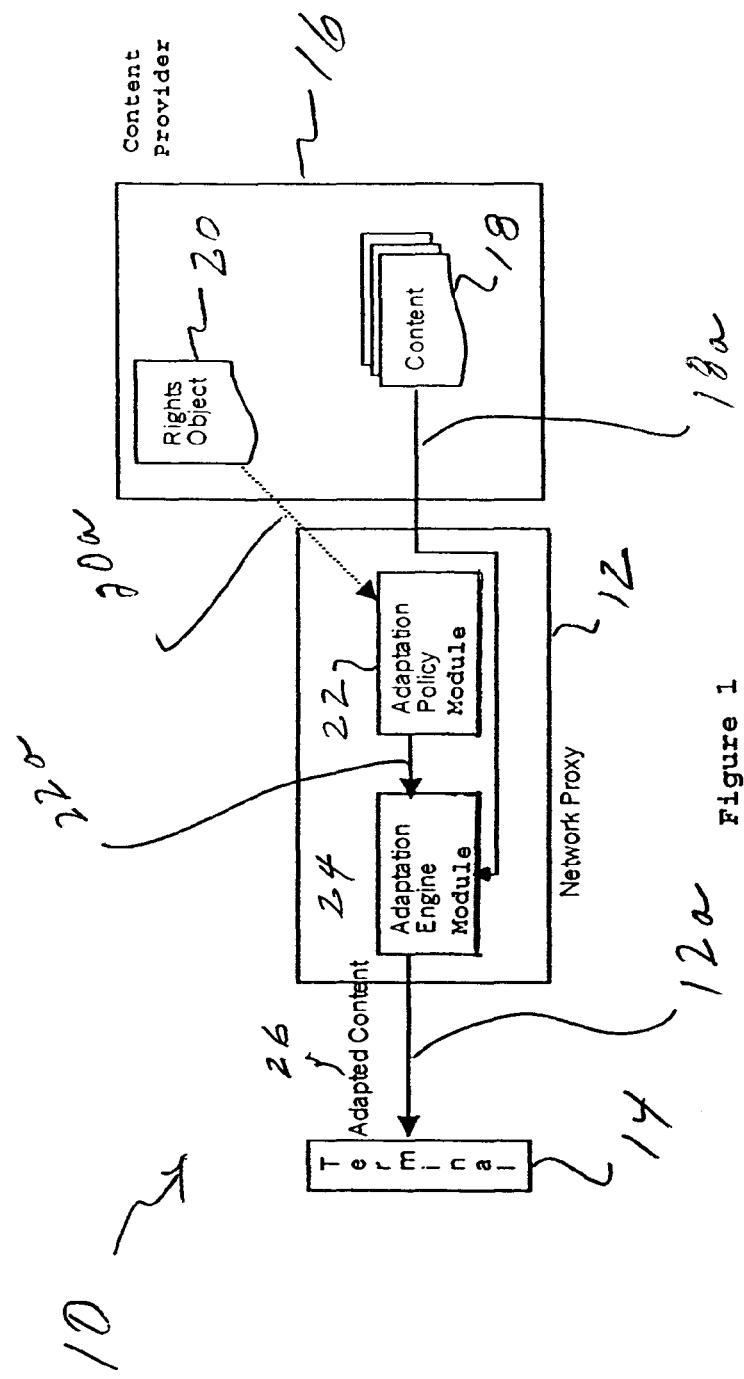
FIG. 1 is a block diagram of a mobile network that is the subject matter of the present invention.

FIG. 1 shows a mobile network generally indicated as 10 having a network proxy 12 arranged between a mobile terminal 14 and a content provider 16 for providing content indicated as 18. The network proxy 12 adapts or transforms the content 18 based on one or more digital rights indicated as 20 (also referred to herein as rights objects) issued by the owner of the content 18. In one embodiment, the content provider 16 passes in a signal along signal path 18a containing the one or more digital rights 20 issued by the owner of the content 18 to the network proxy 12 in a file along with the content 18 provided in a signal along signal path 20a.

The network proxy 12 includes an adaption policy module 22 that receives the signal along signal path 20a containing the digital rights and provides in a signal along signal path 22a containing an adaptation policy; and an adaptation engine module 24 that receives the signal along signal path 22a containing the adaptation policy and the signal along the signal path 18a containing the content 18 from the content provider 16, and provides a signal along signal path 12a containing adapted content 26 to the terminal 14.

The adaptation policy module 22 and the adaptation engine module 24 may be implemented using hardware, software, or a combination thereof. The scope of the invention is not intended to be limited to any particular implementation thereof. For example, a typical software implementation may include using a microprocessor architecture having a microprocessor, a random access memory (RAM), a read only memory (ROM), input/output devices and a control, address and databus for connecting the same.

Figure 2:
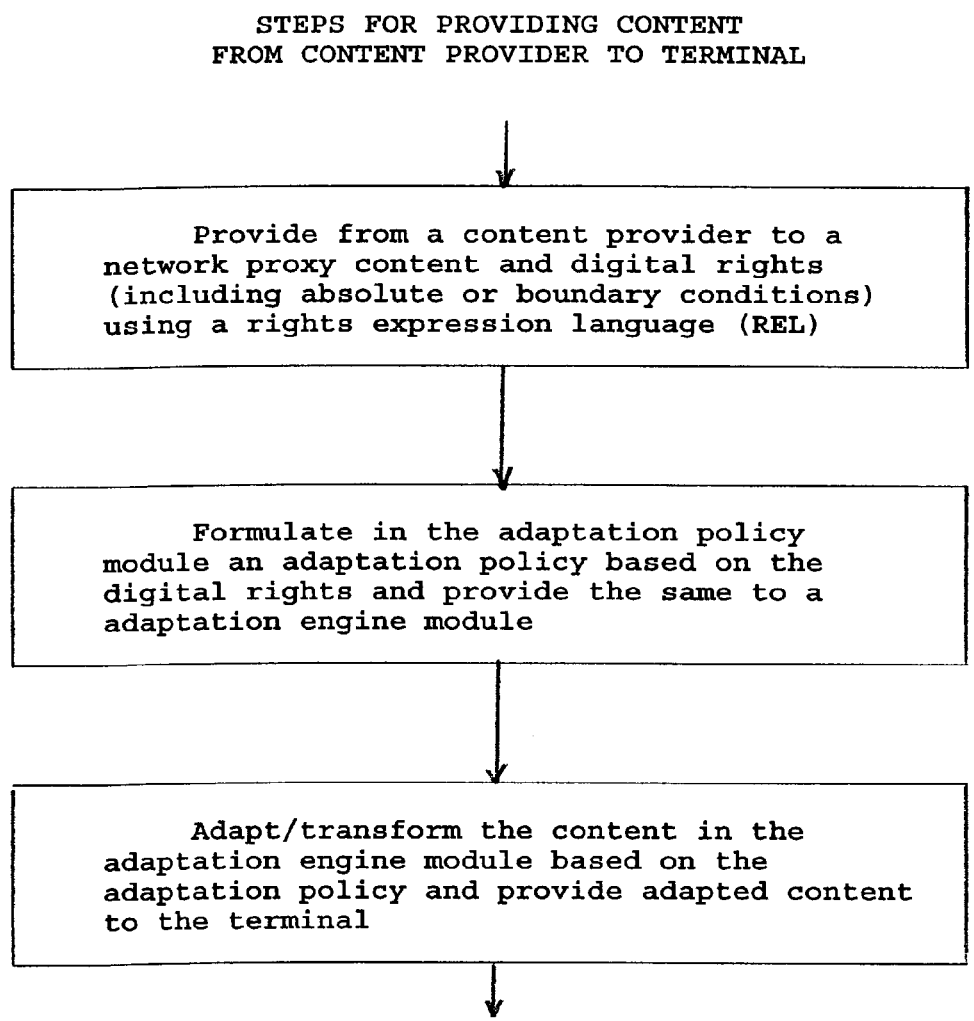
FIG. 2 is a flowchart of steps for providing content from a content provider to a terminal.

In effect, the present invention provides a new and unique method and approach to use the digital rights 20 for content adaptation. See FIG. 2. As described herein, the invention provides for the owner of the content to issue digital rights to adapt the content 18. And these rights can be used by the network proxy 12 (which is also known as the middleware server or intermediary proxy) to do the adaptation, for a particular terminal such as 14. This invention is applicable for any type of content ranging from person-to-person content, application-to-person content and web browsing content in general.

The present invention can be implemented very easily by issuing and using digital rights for granting the necessary privileges for adapting the content, as well as defining restrictions under which the adaptation/transformation procedure may take place. Under this implementation plan, the content provider 16 provides the rights and the constraints for adaptation along with the original content 18 to the network proxy 12. The network proxy 12 uses the rights and the constraints to determine the optimal adaptation policy in the adaptation policy module 22 and then uses that policy to transform the content in the adaptation engine module 24. Since the content provider 16 is providing the rights, it in effect has the responsibility of ensuring that the integrity of the content 18, if lost due to transformation. This type of approach will not give rise to any legal issues in relation to the content being improperly adapted/transformed, since the network proxy 12 knows what can and cannot be done with the content adaptation.

The scope of the invention is not intended to be limited to who the owner of the content is. Embodiments are envisioned in which the content provider or a party other than the content provider is the owner of the content that issues the one or more digital rights.

Rights Expression Language (REL)

The present invention also provides a method and approach to represent rights for content adaptation in the form of a language or schema that can be used by the content owner or provider 16 to issue rights to the content consumer or terminal 14. The Open Mobile Alliance (OMA) has specified a Rights Expression Language (REL) which is based on Open Digital Rights Language (ODRL). OMA REL is in a way a mobile profile of ODRL. The present invention provides an extension to OMA REL by adding elements and attributes in OMA REL.

In one embodiment, this can be done by defining an extension to the ODRL schema, which can be used by OMA REL.

For example, the OMA REL can be extended to represent adaptation rights as follows:

<!ELEMENT o-ex:permission (o-dd:play?, o-dd:display?, o-dd:execute?, o-dd:print?, o-dd:adapt?)>
<!ELEMENT o-dd:adapt (o-ex:constraint?)>
<!ELEMENT o-ex:constraint (o-dd:count?, o-dd:datetime?, o-dd:interval?, o-dd:color?, o-dd:size?, o-dd:format?, o-dd:layout?, o-dd:quality?)>
<!ELEMENT o-dd:color (#PCDATA)>
<!ELEMENT o-dd:size (#PCDATA)>
<!ELEMENT o-dd:layout (#PCDATA)>

The precondition to use these rights elements is that the following changes are made to the ODRL REL Version 1.1, as proposed below.

The following new rights element "adapt" of type "permissionElement" can be added to the ODRL schema datatypes to allow for content adaptation right. Although there exists an element "modify" in ODRL, but it's use has been defined in terms of reuse of content which is not appropriate in this case.

<xsd:element name="adapt" type="o-ex:permissionType" substitutionGroup="o-ex:permissionElement"/>

Also, the following rights elements "color", "size", "reformat", "layout" etc. may also be added to the list of constraint elements to allow for content adaptation. See FIG. 3.

One possible way is to modify the ODRL Expression Language Version 1.1 to include these elements so that the REL expression derived from the ODRL can inherit these elements and can be used to specify the associated rights for content adaptation.

Another possible approach would be to extend the ODRL schema to include these elements and use that schema for the OMA REL.

The method of specifying the rights for adaptation in the REL frees the network proxy from the problem of improperly or illegally adapting/transforming the content, which may include for example a copyright violation that may otherwise give rise to legal issues.

The scope of the invention is also intended to include other constraints or restrictions specific for audio and video, alone or in combination with the content constraints or restrictions described above.

Moreover, although the invention is shown and described by way of example in relation to a mobile network, the scope of the invention is intended to include other types of networks, including networks in the Web/internet, mobile, proximity and/or wireless domains.

SCOPE OF THE INVENTION

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

We claim:

1. A method comprising:
   receiving at a network proxy computer, via a first network connection, original unmodified content from a content provider;
   receiving, at the network proxy computer, digital rights management (DRM) information associated with the content from the content provider, the DRM information including an adapt element specifying digital rights for adaptation and a constraint element with respect to color, size, format, and layout of the content;
   determining, at the network proxy computer, an adaptation policy based on at least an adaptation policy associated with the content provider and based at least partially on the DRM information;
   determining, at the network proxy computer, a transformation to adapt the content for a terminal based at least in part on capabilities of the terminal related to at least one of color, size, format, and layout, the transformation changing the content regarding the at least one of color, size, format, and layout but without violating the restrictions specified in the adapt element based on the determined adaptation policy;
   modifying, at the network proxy computer, the content based at least partially on the transformation; and
   providing, via a second network connection, the modified content to the terminal,
   wherein the DRM information is expressed using a rights expression language having digital rights elements including an adapt element for providing a digital right in the form of a constraint on adapting the content.

2. The method of claim 1 wherein the original unmodified content and the DRM information are received in the same file.

3. The method of claim 1 further comprising:
   determining an adaptation policy that does not violate the restrictions; and
   using the adaptation policy to modify the content.

4. The method of claim 1 wherein the DRM information is issued using any rights expression language.

5. The method of claim 4 wherein the rights expression language includes a permission element for adapting the content, which permission element can be executed in combination with other permission elements.

6. The method of claim 1 wherein the constraint is an absolute constraint for adapting the content.

7. A non-transitory computer-readable storage medium including one or more instructions, which when executed by one or more processors cause the one or more processors to at least perform the following:
   receive at a network proxy computer, via a first network connection, original unmodified content from a content provider;
   receive, at the network proxy computer, digital rights management (DRM) information associated with the content from the content provider, the DRM information including an adapt element specifying digital rights for adaptation and a constraint element with respect to color, size, format, and layout of the content;
   determine, at the network proxy computer, an adaptation policy based on at least an adaptation policy associated with the content provider and based at least partially on the DRM information;
   determine, at the network proxy computer, a transformation to adapt the content for a terminal based at least in part on capabilities of the terminal related to at least one of color, size, format, and layout, the transformation changing the content regarding the at least one of color, size, format, and layout but without violating the restrictions specified in the adapt element based on the determined adaptation policy;
   modify, at the network proxy computer, the content based at least partially on the transformation; and
   provide, via a second network connection, the modified content to the terminal,
   wherein the DRM information is expressed using a rights expression language having digital rights elements including an adapt element for providing a digital right in the form of a constraint on adapting the content.

8. The non-transitory computer-readable storage medium of claim 7 wherein the original unmodified content and the DRM information are received in the same file.

9. The non-transitory computer-readable storage medium of claim 7 including instructions that cause the one or more processors to further performing the following:
   determine an adaptation policy that does not violate the restrictions; and
   use the adaptation policy to modify the content.

10. The non-transitory computer-readable storage medium of claim 7 wherein the DRM information is issued using any rights expression language.

11. The non-transitory computer-readable storage medium of claim 10 wherein the rights expression language includes a permission element for adapting the content, which can be executed in combination with other permission elements.

12. The non-transitory computer-readable storage medium of claim 7 wherein the constraint is an absolute constraint for adapting the content.

13. A network proxy computer device comprising:
   one or more hardware processors; and
   at least one memory including computer program code, the at least one memory and the computer program code configured to, with the at least one processor, cause the network proxy computer device to perform at least the following:
   receive, via a first network connection, original unmodified content from a content provider;
   receive digital rights management (DRM) information associated with the content from the content provider, the DRM information including an adapt element specifying digital rights for adaptation and a constraint element with respect to color, size, format, and layout of the content;

determine an adaptation policy based on at least an adaptation policy associated with the content provider and based at least partially on the DRM information;

determine a transformation to adapt the content for a terminal based at least in part on capabilities of the terminal related to at least one of color, size, format, and layout, the transformation changing the content regarding the at least one of color, size, format, and layout but without violating the restrictions specified in the adapt element based on the determined adaptation policy;

modify the content based at least partially on the transformation; and provide, via a second network connection, the modified content to the terminal, wherein the DRM information is expressed using a rights expression language having digital rights elements including an adapt element for providing a digital right in the form of a constraint on adapting the content.

14. The network proxy computer device of claim 13 wherein the original unmodified content and the DRM information are received in the same file.

15. The network proxy computer device of claim 13 including instructions that cause the one or more processors to further performing the following:

determine an adaptation policy that does not violate the restrictions; and use the adaptation policy to modify the content.

16. The network proxy computer device of claim 13 wherein the DRM information is issued using any rights expression language.

17. The network proxy computer device of claim 16 wherein the rights expression language includes a permission element for adapting the content, which can be executed in combination with other permission elements.

18. The network proxy computer device of claim 13 wherein the constraint is an absolute constraint for adapting the content.

* * * * *